(12) United States Patent
Nakata

(10) Patent No.: US 7,965,648 B2
(45) Date of Patent: Jun. 21, 2011

(54) SPEED CALCULATION SYSTEM

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 1311 days.

(21) Appl. No.: 10/585,407

(22) PCT Filed: Jan. 13, 2005

(86) PCT No.: PCT/JP2005/000286
§ 371 (c)(1),
(2), (4) Date: Jul. 7, 2006

(87) PCT Pub. No.: WO2005/069558
PCT Pub. Date: Jul. 28, 2005

(65) Prior Publication Data
US 2009/0190493 A1    Jul. 30, 2009

(30) Foreign Application Priority Data
Jan. 14, 2004    (JP) ................................ 2004-006760

(51) Int. Cl.
H04J 1/16    (2006.01)
H04J 3/16    (2006.01)
H04L 12/28   (2006.01)
(52) U.S. Cl. .................. 370/252; 370/412; 370/465
(58) Field of Classification Search .......... 370/252, 370/392, 412, 465
See application file for complete search history.

(56) References Cited

U.S. PATENT DOCUMENTS

| | | | |
|---|---|---|---|
| 5,247,464 A * | 9/1993 | Curtis | 379/25 |
| 6,075,769 A * | 6/2000 | Ghanwani et al. | 370/229 |
| 6,430,160 B1 * | 8/2002 | Smith et al. | 370/252 |
| 6,614,763 B1 | 9/2003 | Kikuchi | |
| 7,099,284 B2 * | 8/2006 | Halme | 370/253 |
| 7,180,858 B1 * | 2/2007 | Roy et al. | 370/232 |
| 7,568,045 B1 * | 7/2009 | Agrawal | 709/233 |
| 2002/0080726 A1 | 6/2002 | Klassen et al. | |
| 2002/0101919 A1 * | 8/2002 | Takada et al. | 375/225 |
| 2002/0169880 A1 | 11/2002 | Loguinov et al. | |
| 2003/0154301 A1 * | 8/2003 | McEachern et al. | 709/237 |
| 2004/0001511 A1 | 1/2004 | Matta | |
| 2004/0203827 A1 * | 10/2004 | Heiner et al. | 455/452.1 |
| 2004/0233931 A1 * | 11/2004 | Cohen | 370/468 |

(Continued)

FOREIGN PATENT DOCUMENTS

JP    2000-224172    8/2000

(Continued)

OTHER PUBLICATIONS

C. Dovrolis et al., "What Do Packet Dispersion Techniques Measure?" IEEE Infocom 2001, pp. 905-914.

(Continued)

*Primary Examiner* — Andrew Lee
(74) *Attorney, Agent, or Firm* — Foley & Lardner LLP

(57) ABSTRACT

In the prior art, in a case of measuring a speed of a narrow-bandwidth path of which the state fluctuates dynamically, a serious influence is placed upon a speed calculation with a sufficient precision, and a performance.

Embedding probe information into a data packet, being actual data, to transfer two at a time allows the data packet having the probe information embedded to act as a probe packet of the packet pair technique as well. Further, in a system including a plurality of the paths, the data packets are distributed to the path two packets by two packets.

17 Claims, 9 Drawing Sheets

U.S. PATENT DOCUMENTS

| | | | |
|---|---|---|---|
| 2005/0100035 A1* | 5/2005 | Chiou et al. | 370/412 |
| 2005/0132062 A1* | 6/2005 | Halme | 709/227 |
| 2009/0086628 A1* | 4/2009 | Gracon et al. | 370/230 |

FOREIGN PATENT DOCUMENTS

| | | |
|---|---|---|
| JP | 2004-524782 | 8/2004 |

OTHER PUBLICATIONS

L. Angrisiani et al., "Performance Comparison of Different Techniques for Available Bandwidth Measurement in Packet Switched Network," Virtual Environments, Human-Computer Interfaces and Measurement System, 2003, VECIMS 2003 IEEE International Symposium pp. 212-217.

R. L. Carter et al., "Measuring Bottleneck Link Speed in Packet-Switched Networks," Technical Report Computer Science, Mar. 15, 1996, URL:http://citseerx.ist.psu.edu/viewdoc/summary?doi+10.1.30.156> 24 pp.

A. Johnsson, "On the Comparison of Packet-Pair and Packet-Train Measurements," 2003, [Online] URL:http://citeseerx.ist.psu.edu/viewdoc/summary?doi+10.1.1.3.3058> pp. 34-36.

R. Prasead et al., "Bandwidth estimation: metrics, measurement techniques, and tools", IEEE Network, IEEE Service Center, Nov. 1, 2003, pp. 27-35.

R. L. Carter et al., "Measuring Bottleneck Link Speed in Packet-Switched Networks," Mar. 15, 1996.

* cited by examiner

SPEED CALCULATION SYSTEM

TECHNICAL FIELD

The present invention relates to a technology for calculating a communication speed of a communication path, and more particularly, to a technology for inserting probe information into a received packet to be transmitted, thereby to calculate a speed of a path that is an object of calculation.

BACKGROUND ART

In general, there exists a packet pair technique as a conventional example of calculating the communication speed of the communication path that goes through a series of paths (links) and intermediate nodes.

In the packet pair technique, the communication speed of the path, which is comprised of high-speed and low-speed links connecting a transmission node and a reception node, is the object of calculation. The transmission node successively transmits two probe packets (packet pair) dedicated for calculating the speed of the path that is an object of calculation, and the speed of the path is derived from a difference between arrival times of two packets, which arises as a result of transmission. In doing this, so as to limit the cause of arrival time difference between two packets, which is measured at the reception node, to a dispersion of transmission delay between two points alone, the transmission node transmits two packets at as close times as possible.

Further, as another conventional example, i.e. as a conventional example except the packet pair technique, there exists a packet train technique (for example, non-patent document 1).

[Non-Patent Document 1]

Dovrolis, Ramanathan, and Moore, "What Do Packet Dispersion Techniques Measure?" IEEE INFOCOM 2001

The packet train technique, which is a technique of successively transmitting two or more packets, does not necessarily provide a discrete mode of calculation results as in the case of the packet pair technique; nevertheless, a sufficient long measurement duration allows measurement values that converge to a single value.

DISCLOSURE OF THE INVENTION

Problems to be Solved by the Invention

In the packet pair technique, however, disturbance that the packet pair receives differs, depending upon a configuration of the path and a situation of traffic, and as a result, the measurement values that the packet pair technique shows are classified into some discrete "modes". So as to make a determination as to which "mode", out of them, reflects the speed originally required for measurement, it is necessary to acquire a large number of samples.

Further, in any foregoing conventional example, the number of the probe packet has to be increased in order to raise a measurement precision; however an increase in the probe packet number causes oppression upon a bandwidth for data to be augmented because a calculation precision and a bandwidth for data are in a trade-off relation (because a total bandwidth remains unchanged) in a case of calculating the speed in the path under communication. Particularly, with calculation of the speed of the path including a link, in which the communication speed fluctuates violently, like a wireless circuit, a certain number or more of the probe packets have to be transmitted in a short time, whereby the oppression upon the bandwidth for date caused by the calculation of the speed is augmented, which might make it impossible to transmit data in some cases. This is a serious problem because the wireless circuit is also a narrow-bandwidth link, thus the speed calculation under operation like the conventional example is considered impractical.

Thereupon, the present invention has an object of providing a speed calculation system for alleviating oppression upon the bandwidth for data communication including a wireless link.

Means to Solve the Problem

The first invention for solving the above-mentioned problem, which is a speed calculation system for calculating a communication speed of a packet that passes through a communication path connecting a transmission node and a reception node, is characterized in that:

the transmission node includes:
a grouping means for grouping at least two of its received packets; and
a transmission means for affixing probe information for uniquely identifying the grouped packet group to each packet of the packet group, and consecutively transmitting the packets, belonging to an identical packet group; and the reception node includes:
a receiving means for receiving the transmitted packet;
a recording means for recording an arrival time of the received packet;
a determining means for determining whether the probe information is included in the received packet; and
a calculating means for calculating a communication speed based upon a difference between the arrival times of the packets, belonging to an identical packet group as identified by the probe information, among the packets determined to have the probe information included.

The second invention for solving the above-mentioned problem is characterized in that, in the above-mentioned first invention, in a case where the communication path is plural, the transmission means includes further a selecting means for selecting one path from among the plurality of the communication paths.

The third invention for solving the above-mentioned problem is characterized in that, in the above-mentioned second invention, the selecting means selects the communication path of which a communication load is small from among the plurality of the communication paths.

The fourth invention for solving the above-mentioned problem is characterized in that, in one of the above-mentioned first to third inventions, the calculating means is a calculating means for dividing a total bit number of the packets except the packet that arrived firstly, out of the packets, belonging to an identical packet group as identified by the probe information, by a difference between the arrival times, thereby to calculate the communication speed.

The fifth invention for solving the above-mentioned problem is characterized in that, in one of the above-mentioned first to fourth inventions, the transmission node further includes a means for generating at least one dummy packet in a case where, after receiving one packet, the next packet is not received within a predetermined time.

The sixth invention for solving the above-mentioned problem is characterized in that, in one of the above-mentioned first to fifth inventions, the transmission node further includes a means for generating at least two dummy packets in a case where the packet is not received within a predetermined time.

The seventh invention for solving the above-mentioned problem, which is a node of a calculation system for, from a difference between arrival times of consecutively transmitted packets, calculating a speed of the packet, is characterized in that the node is a transmission node and this node includes:

a grouping means for grouping at least two of its received packets; and a transmission means for affixing probe information for uniquely identifying the grouped packet group to each packet of the packet group, and consecutively transmitting the packets, belonging to an identical packet group.

The eighth invention for solving the above-mentioned problem is characterized in that, in the above-mentioned seventh invention, in a case where a communication path is plural, the transmission means further includes a selecting means for selecting one path from among the plurality of the communication paths.

The ninth invention for solving the above-mentioned problem, which is a node of a calculation system for, from a difference between arrival times of received packets, calculating a speed of the packet, is characterized in that the node is a reception node and this node includes:

a receiving means for receiving the packet;

a recording means for recording the arrival time of the received packet;

a determining means for determining whether the probe information is included in the received packet; and a calculating means for calculating a communication speed based upon a difference between the arrival times of the packets, belonging to an identical packet group as identified by the probe information, among the packets determined to have the probe information included.

The tenth invention for solving the above-mentioned problem, which is a speed calculation method for calculating a speed of a packet that passes through a communication path connecting a transmission node and a reception node, is characterized in including:

a grouping step of grouping at least two of its received packets;

a transmission step of affixing probe information for uniquely identifying the grouped packet group to each packet of the packet group, and consecutively transmitting the packets, belonging to an identical packet group;

a receiving step of receiving the transmitted packet and causing a recorder to record an arrival time of this received packet;

a determining step of determining whether the probe information is included in the received packet; and a calculating step of calculating a communication speed based upon a difference between the arrival times of the packets, belonging to an identical packet group as identified by the probe information, among the packets determined to have the probe information included.

The eleventh invention for solving the above-mentioned problem is characterized in that, in the above-mentioned tenth invention, in a case where the communication path is plural, the transmission step further includes a selecting step of selecting one path from among the plurality of the communication paths.

The twelfth invention for solving the above-mentioned problem is characterized in that, in the above-mentioned eleventh invention, the selecting step is a step of making a selection so that communication loads in the plurality of the communication paths can be dispersed.

The thirteenth invention for solving the above-mentioned problem is characterized in that, in one of the above-mentioned tenth to twelfth inventions, the calculating step is a step of dividing a total bit number of the packets except the packet that arrived firstly, out of the packets, belonging to an identical packet group as identified by the probe information, by a difference between the arrival times, thereby to calculate the communication speed.

The fourteenth invention for solving the above-mentioned problem is characterized in, in one of the above-mentioned tenth to thirteenth inventions, further including a step of generating one dummy packet in a case where, after receiving one packet, the next packet is not received within a predetermined time.

The fifteenth invention for solving the above-mentioned problem is characterized in, in one of the above-mentioned tenth to fourteen inventions, further including a step of generating two dummy packets in a case where the packet is not received within a predetermined time.

The sixteenth invention for solving the above-mentioned problem, which is a program of a speed calculation system for calculating a speed of a packet that passes through a communication path connecting a transmission node and a reception node, is characterized in that:

the program causes the transmission node to function as:
a grouping means for grouping at least two of its received packets; and
a transmission means for affixing probe information for uniquely identifying the grouped packet group to each packet of the packet group, and consecutively transmitting the packets, belonging to an identical packet group; and the program causes the reception node to function as:
a receiving means for receiving the transmitted packet;
a recording means for causing a recorder to record an arrival time of the received packet;
a determining means for determining whether the probe information is included in the received packet; and
a calculating means for calculating a communication speed based upon a difference between the arrival times of the packets, belonging to an identical packet group as identified by the probe information, among the packets determined to have the probe information included.

The seventeenth invention for solving the above-mentioned problem is characterized in that, in the above-mentioned sixteenth invention, in a case where the communication path is plural, the program further causes the transmission means to function as a selecting means for selecting one path from among the plurality of the communication paths.

The eighteenth invention for solving the above-mentioned problem is characterized in that, in the above-mentioned seventeenth invention, the program causes the selecting means to function so as to make a selection so that communication loads in the plurality of the communication paths can be dispersed.

The nineteenth invention for solving the above-mentioned problem is characterized in that, in one of the above-mentioned sixteenth to eighteenth inventions, the program causes the calculating means to function as a calculating means for dividing a total bit number of the packets except the packet that arrived firstly, out of the packets, belonging to an identical packet group as identified by the probe information, by a difference between the arrival times, thereby to calculate the communication speed.

The twentieth invention for solving the above-mentioned problem is characterized in that, in one of the above-mentioned sixteenth to twentieth inventions, the program further causes the grouping means to function as a means for generating one dummy packet in a case where, after receiving one packet, the next packet is not received within a predetermined time.

The twenty-first invention for solving the above-mentioned problem is characterized in that, in one of the above-mentioned sixteenth to twentieth inventions, the program further causes the grouping means to function as a means for generating two dummy packets in a case where the packet is not received within a predetermined time.

The twenty-second invention for solving the above-mentioned problem, which is a program of a node in a calculation system for, from a difference between arrival times of consecutively transmitted packets, calculating a speed of the packet, is characterized in that, in a case where the node is a transmission node, the program causes the node to function as:

a grouping means for grouping at least two of its received packets; and a transmission means for affixing probe information for uniquely identifying the grouped packet group to each packet of the packet group, and consecutively transmitting the packets, belonging to an identical packet group.

The twenty-third invention for solving the above-mentioned problem is characterized in that, in the above-mentioned twenty-second invention, in a case where a communication path is plural, the program further causes the transmitting means to function as a selecting means for selecting one path from among the plurality of the communication paths.

The twenty-fourth invention for solving the above-mentioned problem, which is a program of a node in a calculation system for, from a difference between arrival times of received packets, calculating a speed of the packet, is characterized in that, in a case where the node is a reception node, the program causes the node to function as:

a receiving means for receiving the packet;

a recorder for recording the arrival time of the received packet;

a determining means for determining whether the probe information is included in the received packet; and a calculating means for calculating a communication speed based upon a difference between the arrival times of the packets, belonging to an identical packet group as identified by the probe information, among the packets determined to have the probe information included.

The twenty-fifth invention for solving the above-mentioned problem, which is a calculation method of generating and transmitting dummy packets for calculating a speed to calculate a speed of the packet from a difference between arrival times of the dummy packets, is characterized in employing the received packet as a packet for calculating the speed instead of generating the dummy packet.

Effects of the Invention

In accordance with the present invention, embedding probe information into actual data, i.e. a data packet, which passes trough the communication path that becomes an object of speed calculation, instead of generating the probe packet dedicated for calculating the speed, enables oppression upon the bandwidth for communication caused by the probe packet to be reduced.

Further, in accordance with the present invention, inserting the probe information into the data packet, being the actual data, to transmit two data packets at a time, instead of generating the probe packet (dummy packet) dedicated for calculating the speed, enables the calculation of the speed without oppressing the bandwidth even in a narrow-bandwidth path where the speed fluctuates dynamically, of which the practical speed calculation is difficult, for example, a wireless link etc.

Further, in accordance with the present invention, in a connection between two nodes including a plurality of paths each of which is an object of calculation, arranging distribution of the data packets to the path two by two enables the calculation of the speed of each path.

Yet further, in accordance with the present invention, in a case where two nodes are connected by means of a plurality of the communication paths, selecting the communication path of which a communication load is small enables oppression upon the communication bandwidth to be reduced.

EXPLANATION OF SYMBOLS

Figure 1:
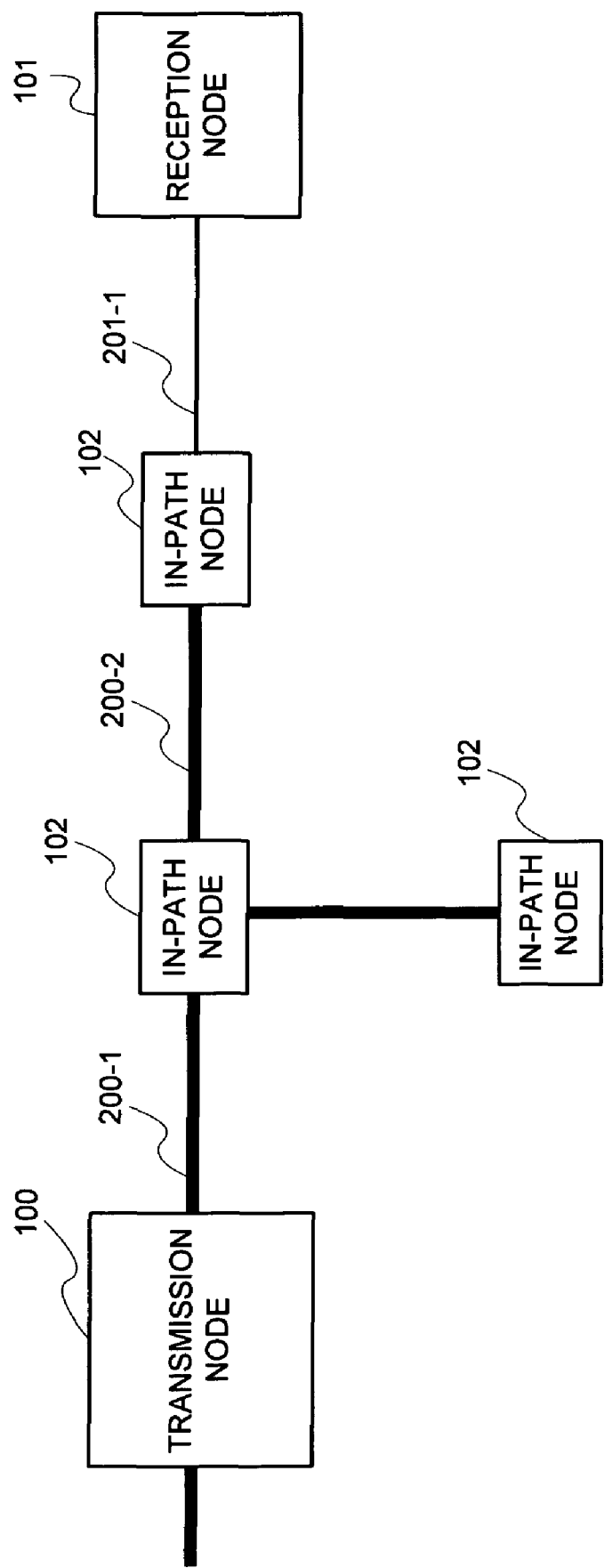
FIG. 1 is a configuration view of the path between nodes of the present invention.

100 transmission node
101 reception node
102 in-path node
110 transmission node
120 transmission node
121 reception node
200 high-speed link
201 low-speed link
301 transfer controller
302 buffer memory
303 transmitter
304 dummy generator
305 scheduler
400 packet group over high-speed link
401 packet group over low-speed link
501 receiver
502 packet identifying section
503 recorder
504 arithmetic section
505 memory

BEST MODE FOR CARRYING OUT THE INVENTION

The present invention aims for application for the speed calculation of the data path including an unstable and low-speed link.

FIG. 1 is a schematic view for explaining the present invention. Herein, the communication speed of the path, which is comprised of high-speed links 200-1 and 200-2 and a low-speed link 201-1 that go from a transmission node 100 to a reception node 101, is an object of calculation.

In the present invention, the transmission node 100 consecutively transmits two packets to the path that is an object of calculation, and derives the speed of the path from a difference between arrival times of two packets, which arises as a result of transmission. In doing this, so as to limit the cause of an arrival time difference between two packets, which is observed at the reception node, to a dispersion of transmission delay between two points alone, the transmission node transmits two packets at as close times as possible.

Embodiment 1

Figure 2:
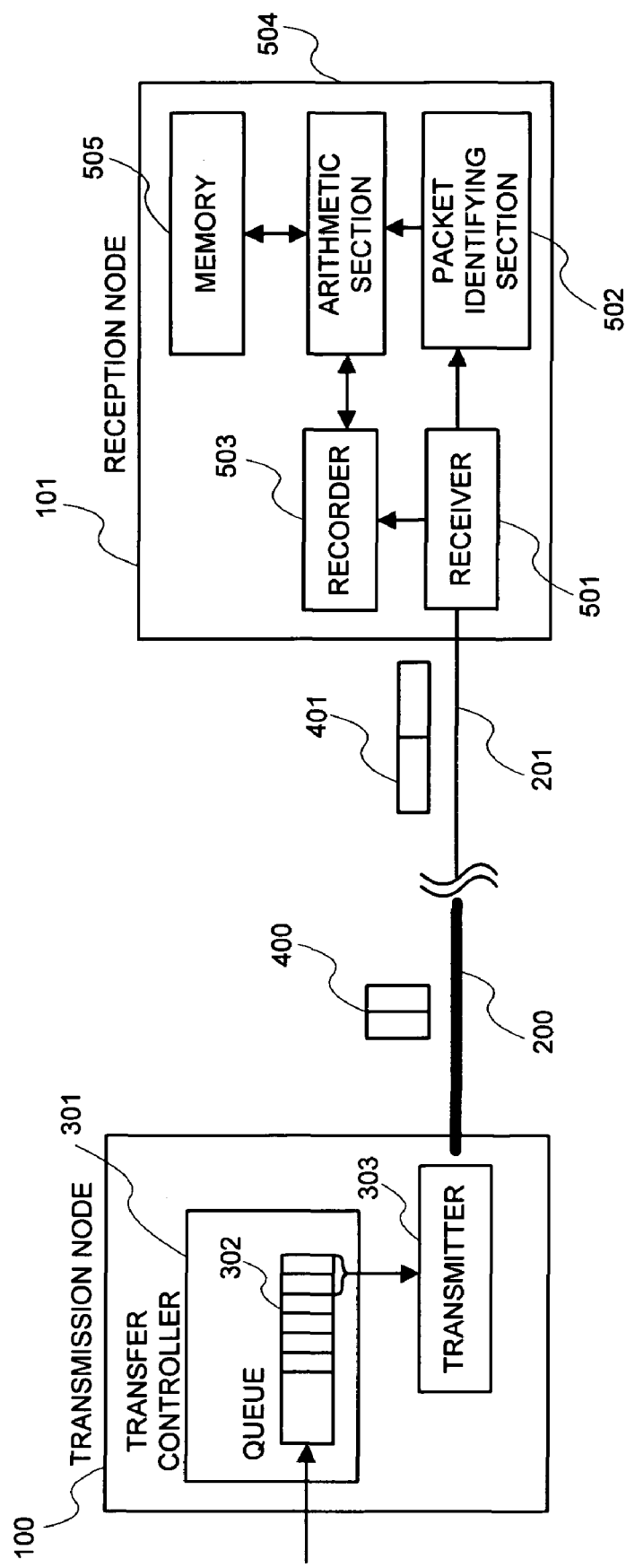
FIG. 2 is a configuration view of the transmission node and the reception node in an embodiment 1.

The embodiment 1 in the present invention will be explained. FIG. 2 is a detailed view of the system of the present invention.

Upon making a reference to FIG. 2, the embodiment of the present invention is configured of the transmission node 100 and the reception node 101. Further, the transmission node 100 and the reception node 101 are connected by means of a high-speed link 200 and a low-speed link 201, being a path that is an object of speed calculation respectively.

The transmission node 100 is configured of a transfer controller 301 and a transmitter 303.

The transfer controller 301 receives the data packet that arrives at a random timing. This so-called packet is a data packet of which a payload portion has the actual data inserted. The received data packet is filed in a queue 302, which the transfer controller 301 has, for the time being. Further, the transfer controller 301 groups at least two data packets and transfers the data packets to the transmitter 303 group by group when a plurality of the data packets are filed in the queue 302. Additionally, in this embodiment, the case of grouping two data packets will be explained.

Figure 3:
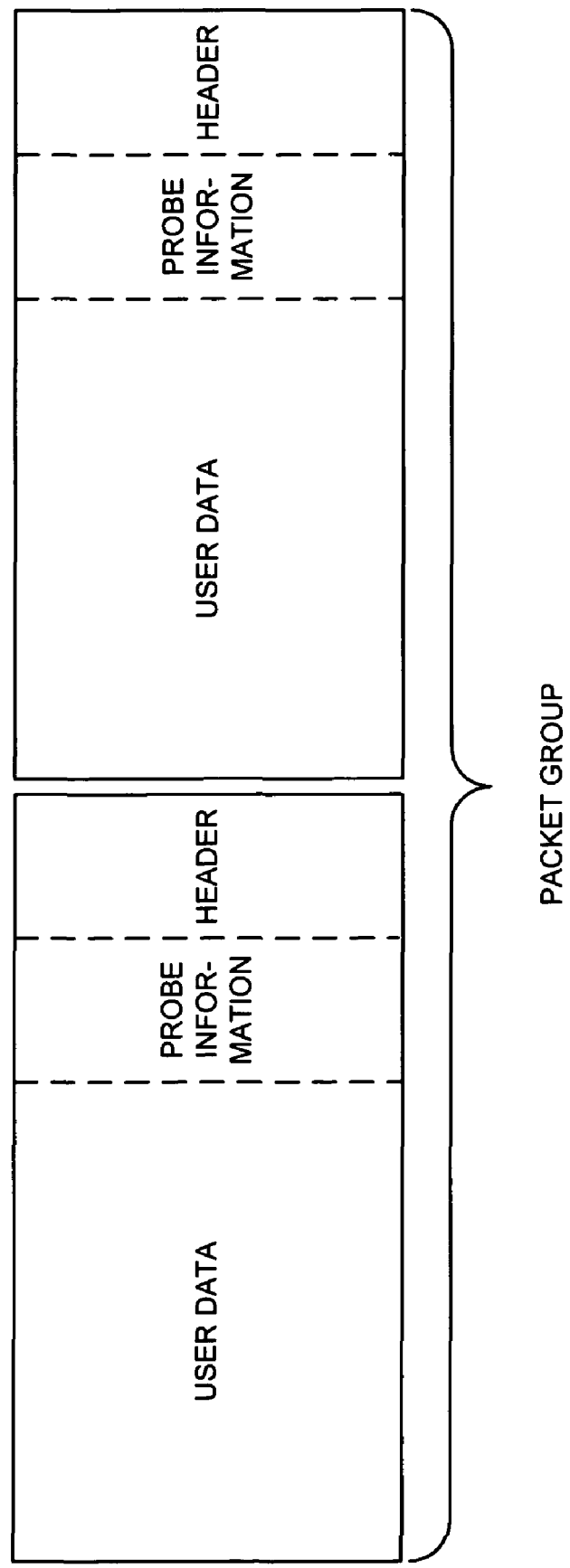
FIG. 3 is a configuration view of the packet group.

The transmitter 303, as shown in FIG. 3, inserts probe information into each data packet transferred from the transfer controller 301, and consecutively transmits the data packets, belonging to an identical packet group, to the high-speed link 200. The so-called probe information that is inserted into each data packet is information for uniquely identifying the group to which each data packet belongs. Additionally, the extent of oppression upon the bandwidth due to insertion of the probe information is far smaller than that of the case of independently preparing the packet for measurement.

The reception node 101 is configured of a receiver 501, a packet identifying section 502, a recorder 503, an arithmetic section 504, and a memory 505.

The receiver 501 receives the data packet and transfers it to the packet identifying section 502.

The recorder 503 records a reception completion time that the receiver 501 received the data packet. In recording the reception completion time that the receiver 501 received the data packet, the recorder 503 records the reception completion time correspondingly to identification information of the data packet recorded in an IP header of its data packet.

The packet identifying section 502 determines whether the data packet transferred from the receiver 501 is a data packet including the probe information. Further, when the packet identifying section 502 determines that it is a data packet including the probe information, it delivers the probe information included in its data packet, the identification information of the data packet, and a bit number of its data packet to the arithmetic section 504.

Based upon the identification information of the data packet received from the packet identifying section 502, the arithmetic section 504 draws out the reception completion time of its data packet from the recorder 503. Further, the arithmetic section 504 files the drawn-out reception completion time correspondingly to the probe information and the bit number of its data packet in the memory 505. In addition hereto, the arithmetic section 504 takes out the reception completion times of the data packets, belonging to an identical packet group, from the memory 505, and derives the speed of the communication path, which is an object of speed calculation, based upon arbitrary algorithm. Additionally, as an example of the algorithm for deriving the speed of the communication path that is an object of calculation, the example is listed of assuming the result obtained by dividing the total bit number of the data packets except the firstly received data packet, out of an identical packet group, by a difference between the reception completion time of the firstly received data packet and that of the lastly received data packet, out of the data packets, belonging to an identical packet group, to be a measurement value of the speed. In the present invention, the above-mentioned example is employed for explanation; however any method other than the foregoing may be acceptable.

The memory 505 files the reception completion time drawn out from the recorder 503 by the arithmetic section 504 as a measurement result correspondingly to the probe information and the bit number of its data packet. Additionally, in the memory 505 in the present invention, the measurement result having the reception completion time and the probe information caused to correspond to each other is filed, and this case will be explained; however, for example, the speed of the communication path derived by the arithmetic section 504 may be kept as the measurement result.

An operation of the embodiment 1 will be explained below.

The transmission node 100 receives the data packet, which arrives at a random timing, in the transfer controller 301.

The received data packet is filed in the queue 302 for the time being. When two data packets are filed in the queue 302, its two data packets are grouped and transferred to the transmitter 303. The probe information is inserted into the transferred data packets in the transmitter 303. The data packets of the identical packet group into which the probe information has been inserted are consecutively transmitted to the high-speed link 200, being a first link of the path that is an object of speed calculation.

The data packets consecutively transmitted to the high-speed link 200 transmits over the low-speed link 201, being a last link of the path that is an object of speed calculation. At this time, the data packets that transmit over the low-speed link 201 spread like a data packet 401 of FIG. 2 due to a restriction to the speed of the low-speed link 201. The data packet that transmitted over the low-speed link 201 is received in the receiver 501 of the reception node 101. When the data packet is received in the receiver 501, the reception completion time and the data packet identification information of its data packet are recorded correspondingly to each other in the recorder 503. And, the received data packet is transferred to the packet identifying section 502. It is determined in the packet identifying section 502 whether the transferred data packet is a data packet including the probe information. When it is determine in the packet identifying section 502 that it is a data packet including the probe information, then, the probe information, the data packet identification information and the bit number of its data packet are delivered to the arithmetic section 504.

Based upon the identification information of the data packet received from the packet identifying section 502, the arithmetic section 504 draws out the reception completion time of its data packet from the recorder 503. The drawn-out reception completion time is filed in the memory 505 correspondingly to the probe information and the bit number of the data packet received from the packet identifying section 502. And, the arithmetic section 504 takes out the reception completion times of the data packets, belonging to an identical packet group, from the memory 505. The arithmetic section 504 calculates a difference between the reception completion time of the firstly received data packet and that of the lastly received data packet, out of the taken-out reception completion times, and divides the total bit number of the data packets except the firstly received data packet by the calculated reception completion time difference, thereby to calculate the measurement value.

Additionally, in the foregoing embodiment, the total bit number of the data packets except the firstly received data packet is divided by the calculated reception completion time difference, thereby to calculate the speed of communication path; however by making a reference to the probe result filed in the memory 505, a statistical process such as an averaging may be performed additionally.

Figure 4:
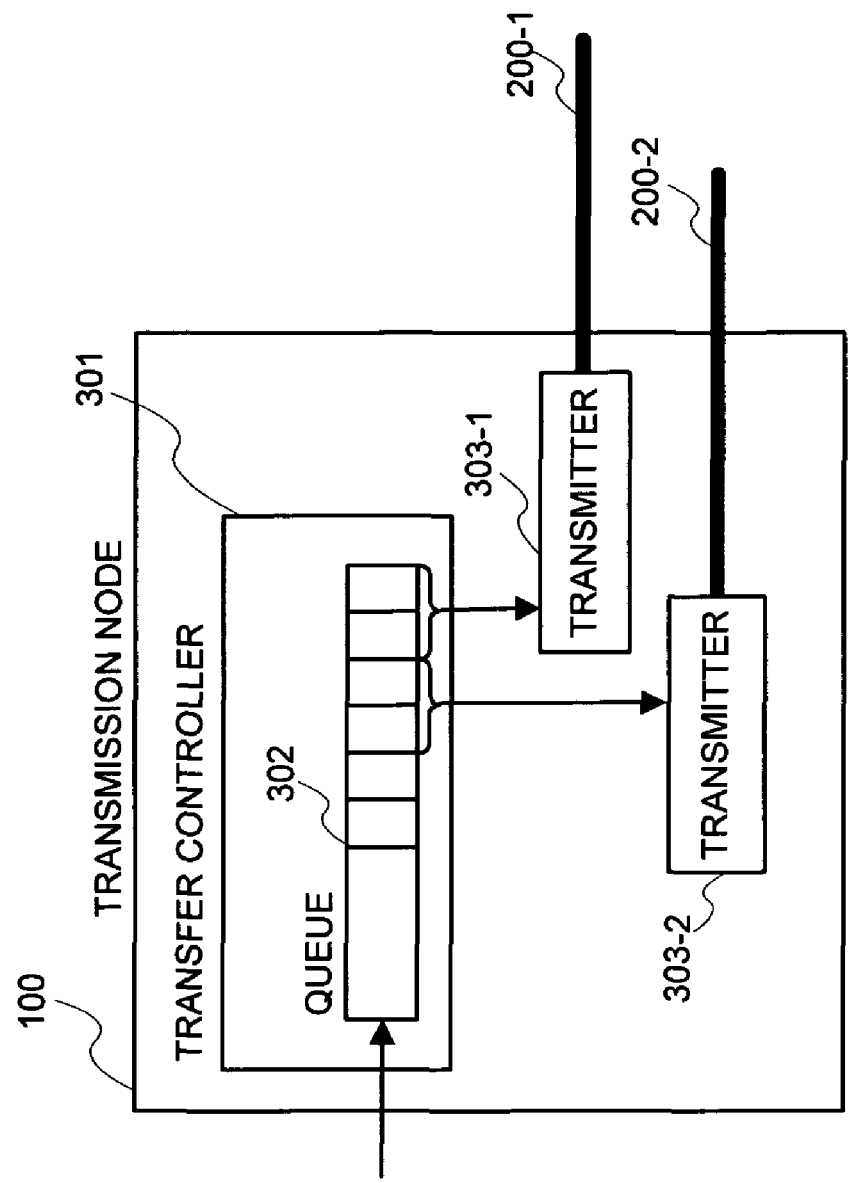
FIG. 4 is a modification example of the embodiment 1.

Further, in the foregoing embodiment, the configuration of connecting the transmission node 100 and the reception node 101 by means of a singular path that was an object of speed calculation was explained; however it is not limited hereto. That is, the configuration of connecting the transmission node 100 and the reception node 101 by means of a plurality of the paths each of which is an object of speed calculation is also acceptable. In this case, as shown in FIG. 4, the transfer controller 301 distributes the grouped data packets to the transmitter 303-1 or the transmitter 303-2 in unit of the packet group.

Embodiment 2

In the above-mentioned embodiment 1, the case of placing no qualification as to which packet group, out of the grouped data packets, was employed for the probe, was explained. That is, all data packets may be grouped and employed for the probe, and the probe information may be inserted into a certain proportion of the data packets out of all data packets. However, as a matter of fact, it is also thinkable that no packet is input for a long time. Thereupon, in the second embodiment, the system allowing the speed calculation of the path to be continued also in such a case will be explained.

Figure 5:
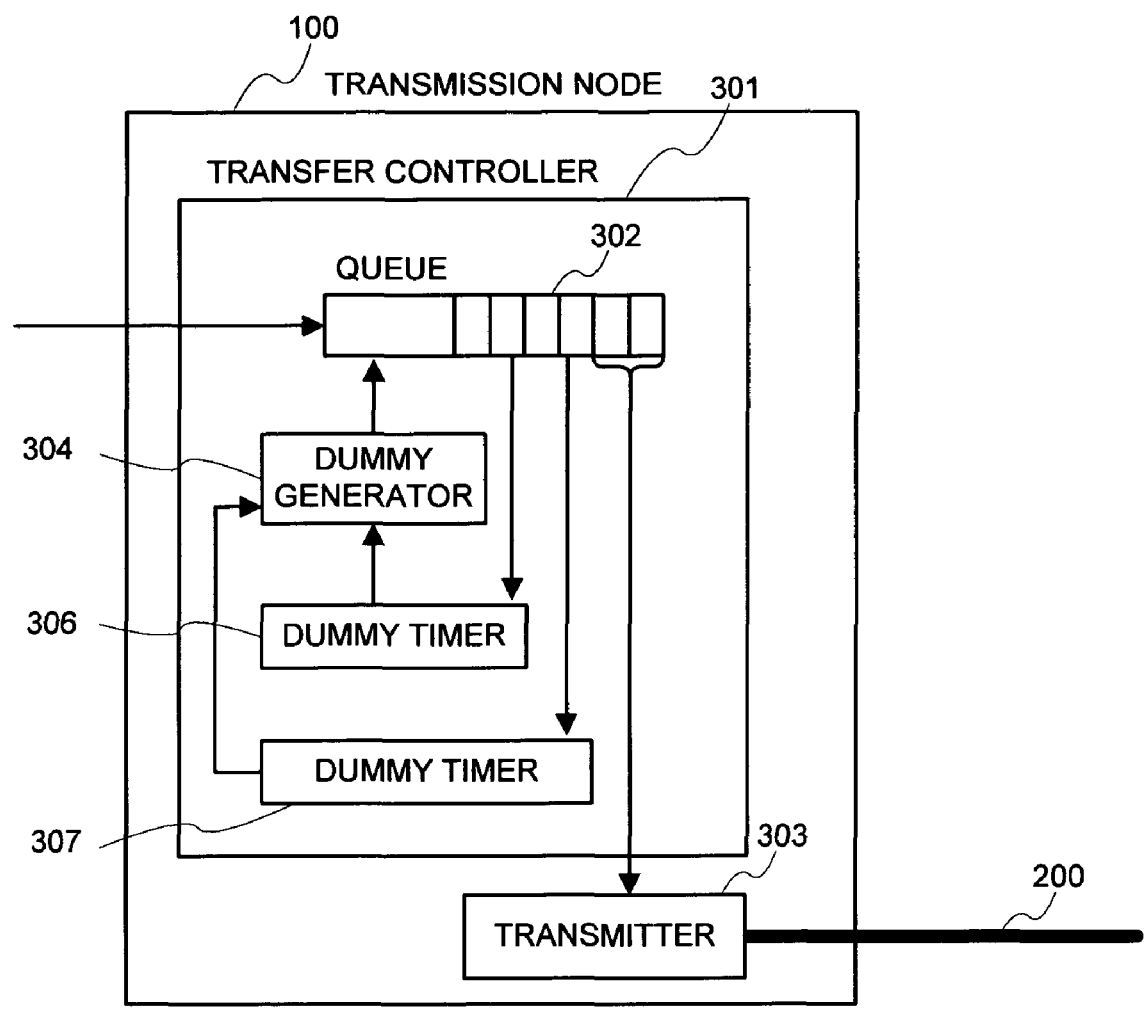
FIG. 5 is a configuration view of the transmission node in an embodiment 2.

FIG. 5 is a configuration view in the embodiment 2. Additionally, the identical number is affixed to the component similar to that of the foregoing embodiment, and detailed explanation is omitted.

A transfer controller 301 includes a dummy generator 304, a dummy timer 306, and a dummy timer 307 in addition to the components explained in the foregoing embodiment.

In a case where the data packet number of a queue 302 is one (1) for a predetermined time or more, the dummy generator 304 generates one dummy packet and delivers it to the transfer controller 301. In addition hereto, in a case where the data packet number of a queue 302 is zero for a c predetermined time or more, the dummy generator 304 generates two dummy packets and delivers them to the transfer controller 301.

The dummy timer 306 starts when one data packer enters the queue 302. When the dummy timer 306 finishes in a state where no grouping of the data packets is made since the starting of the dummy timer 306, the dummy generator 304 generates one dummy data. Additionally, the set time of the dummy timer 306 may be decided, for example, so as to satisfy the probe cycle required for all paths each of which is an object of speed calculation.

The dummy timer 307 starts when the data packet number of the queue 302 becomes zero. When the dummy timer 307 finishes in a state where no grouping of the data packets is made since the starting of the dummy timer 307, the dummy generator 304 generates two dummy data. Additionally, the set time of the dummy timer 307 may be decided, for example, so as to satisfy the probe cycle required for all paths each of which is an object of speed calculation.

Next, an operation of generating one dummy packet in this embodiment will be explained.

Figure 6:
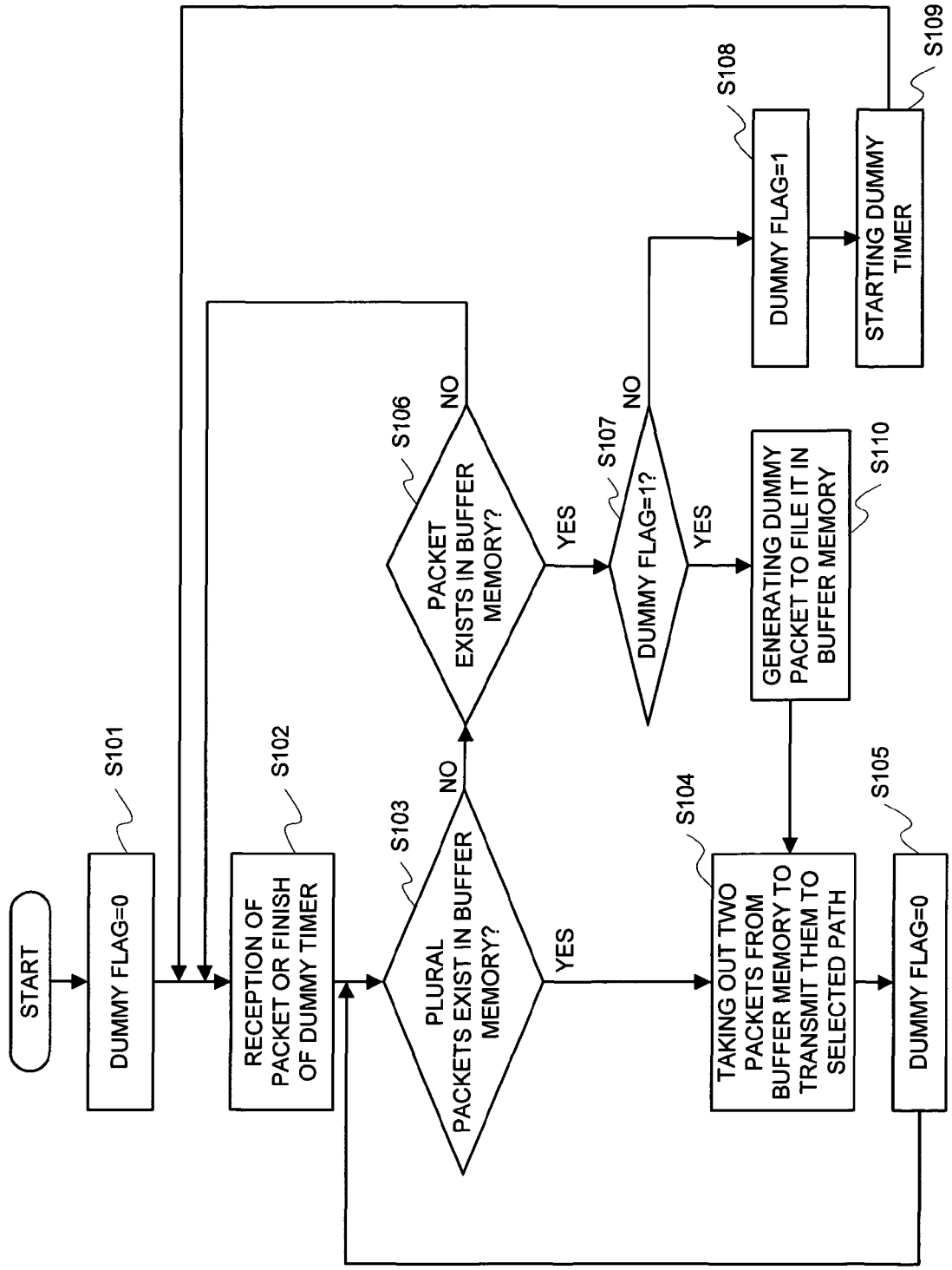
FIG. 6 is a flowchart of the embodiment 2.

FIG. 6 is a flowchart for explaining the operation of generating one dummy packet in this embodiment.

At first, a dummy flag, which is in an initial state, bears 0 (step S101). And, the operation waits for the reception of the data packet or the finish of the dummy timer 306 (step S102). Herein, the dummy timer has not been started yet, whereby the operation waits for the reception of the data packet.

When the transfer controller 301 receives the data packet, the received data packet is filed in the queue 302 for the time being. And, the transfer controller 301 calculates the number of the data packet of the queue 302, and determines whether the number of the data packet is plural (step S103).

At this time, if it is assumed that a plurality of the data packets have been received consecutively, the transfer controller 301 determines that the number of the data packet of the queue 302 is plural, and groups the data packets of the queue 302 to transmit them to the transmitter 303 (step S104). And, the dummy flag is reset (step S105) and the operation returns to the step S103.

On the other hand, if it is assumed that only one data packet has been received, it is determined that the number of the data packet is not plural, and next, it is determined whether the number of the data packet is one (1) (step S106). Herein, only one data packet has been received, whereby it is determined that it is one (1), and next, it is determined whether the dummy flag bears 1 (step S107). At this moment, it is determined that the dummy flag bears 0 because the dummy flag is in an initial state, which means 0 (zero), and one (1) is inserted into the dummy flag (step S108). And, the dummy timer 306 is started (step S109), and the operation returns to the step S102, and waits for the reception of the data packet or the finish of the dummy timer 306.

And, at this time, when the transfer controller 301 receives the data packet, the operation proceeds to the step S103, in which it is determined whether the number of the data packet is plural. Herein, the transfer controller 301 has received the data packet, whereby the operation proceeds to the step S104, in which the transfer controller 301 groups the data packets filed in the queue 302, and transmits them to the transmitter 303. And, the operation proceeds to the step S105, in which the dummy flag is reset, and returns to the step S103.

On the other hand, in a case where the dummy timer 306 started in the step S109 has finished, the operation proceeds to the step S103, in which it is determined whether the number of the data packet is plural. Herein, the data packet has not been received, but the started dummy timer 306 has finished, whereby the operation proceeds to the step S106, in which it is determined whether the number of the data packet is one (1). Herein, when it is determined that it is one (1), the operation proceeds to the step S106, and next, it is determined whether the dummy flag bears 1. At this time, the dummy flag bears 1, whereby the dummy generator 304 prepares one dummy packet and files it in the queue 302 (step S110). When the dummy packet is filed in the queue 302, the operation proceeds to the step S104, in which the transfer controller 301 groups the data packets and the dummy packets filed in the queue 302 and transmits them to the transmitter 303. And, the operation proceeds to the step S105, in which the dummy flag is reset, and returns to the step S103.

Next, in this embodiment, an operation of generating two dummy packets will be explained.

The dummy timer 307 starts when the data packet runs short in the queue 302. And, when a predetermined time elapses and the dummy timer 307 finishes, the dummy generator 304 prepares two dummy packets and files them in the queue 302. When the dummy packets are filed in the queue 302, the transfer controller 301 groups two dummy packets filed in the queue 302 and transmits them to the transmitter 303. And, simultaneously with transmission, the dummy timer 307 is reset.

Additionally, in this embodiment, the dummy timers 306 and 307 are provided in the transfer controller 301; however it is not limited hereto. That is, they may be provided in the dummy generator 304.

Embodiment 3

In the foregoing embodiment, the case of connecting the transmission node 100 and the reception node 101 by means of a singular path that was an object of speed calculation was explained.

In the embodiment 3, the case where a plurality of the paths each of which is an object of speed calculation exist between the transmission node and the reception node will be explained.

Figure 7:
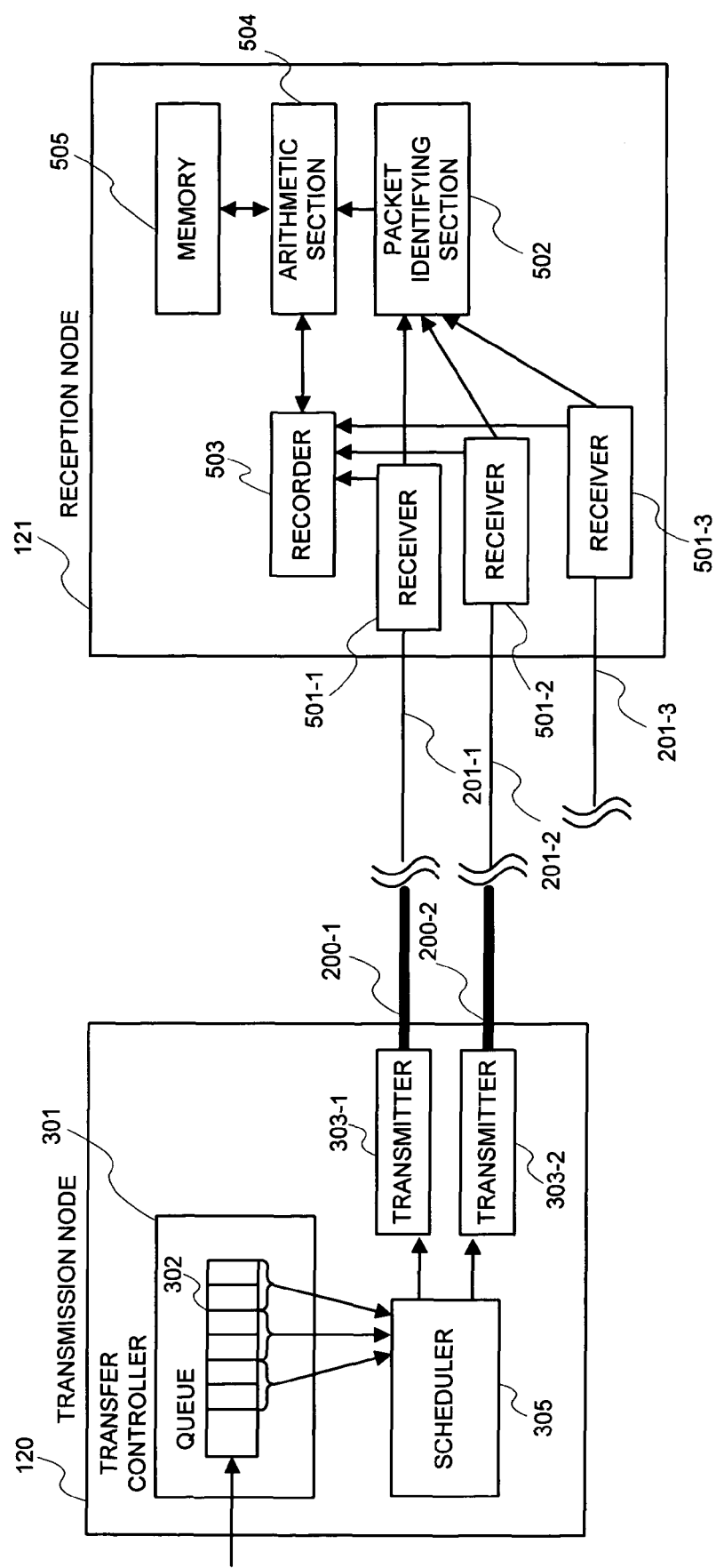
FIG. 7 is a configuration view of an embodiment 3.

FIG. 7 is a view illustrating a network in a case of calculating the speed of plural paths. Additionally, the identical number is affixed to the component similar to that of the foregoing embodiments, and detailed explanation is omitted.

Upon making a reference to FIG. 7, the embodiment of the present invention is configured of a transmission node 120 and a reception node 121, and the transmission node 120 and the reception node 121 are connected by means of a plurality of the paths each of which is an object of speed calculation. Of these paths, one path is a path including a high-speed link 200-1 and a low-speed link 201-1 similarly to that of FIG. 1. The other two paths hold a link 200-2 of the transmission node side in common, and of these two paths, one path is terminated via a low-speed link 201-2 and the other path is terminated via a low-speed link 201-3 in the reception node 121 respectively.

The transmission node 120 is configured of a transfer controller 301 and a plurality of transmitters 303, and a scheduler 305.

The scheduler 305 receives the data packets grouped in the transfer controller 301, and distributes them to the transmitter 303 connected to each path in unit of its grouped data packet. Additionally, as a judgment method for distributing the data packets to each path, there exists, for example, the method of distributing them with load dispersion logic such as round robin algorithm etc.; however in the present invention, any method is acceptable. Further, upon making a path selection determination by employing the load dispersion logic of the round robin algorithm, it is thinkable that the grouped data packets are allocated to respective other paths; however this embodiment makes it a rule to transmit the data packets of the identical group to the identical path.

Next, an operation of this embodiment will be explained.

The transmission node 120 receives the data packet, which arrives at a random timing, in the transfer controller 301.

The received data packet is filed in the queue 302 for the time being. When two data packets are filed in the queue 302, its two data packets are grouped, and transferred to the scheduler 305.

The scheduler 305 receives the grouped data packets, and distributes them to the transmitters 303 in unit of its grouped data packet. The probe information is inserted into the distributed data packet in the transmitters 303. The data packets of the identical group into which the probe information has been inserted are consecutively transmitted to the path connected to each transmitter.

The data packet transmitted from the transmission node 120 is received in a receiver 501-1 to a receiver 501-3 of the reception node 121. When the data packet is received in the receiver 501-1 to the receiver 501-3, the reception completion time and the data packet identification information of its data packet are correspondingly recorded in the recorder 503. And, the received data packet is transferred to the packet identifying section 502. It is determined in the packet identifying section 502 whether the transferred data packet is a data packet including the probe information. When it is determined in the packet identifying section 502 that it is a data packet including the probe information, then, the probe information, the data packet identification information, and the bit number of its data packet are delivered to the arithmetic section 504.

Based upon the identification information of the data packet received from the packet identifying section 502, the arithmetic section 504 draws out the reception completion time of its data packet from the recorder 503. The drawn-out reception completion time is filed in the memory 505 correspondingly to the probe information and the bit number of the data packet received from the packet identifying section 502. And, the arithmetic section 504 takes out the reception completion times of the data packets, belonging to an identical packet group, from the memory 505. The arithmetic section 504 calculates a difference between the reception completion time of the firstly received data packet and that of the lastly received data packet, out of taken-out reception completion times, and divides the total bit number of the data packets except the firstly received data packet by the calculated reception completion time difference, thereby to calculate the measurement value.

Additionally, in the present invention, the path identification information for identifying which path, out of a plurality of the paths, is employed for transmitting the data packet may be affixed in the transmission node in transmitting the data packet, or may be affixed in the reception node in receiving the data packet.

In addition hereto, in the foregoing configuration, the process of the data packet received in each of the receivers 501-1 to 501-3 is performed by the packet identifying section 502, the arithmetic section 504, and the recorder 503 that are common to the receivers 501-1 to 501-3; however, in the present invention, each receiver may include its own packet identifying section, arithmetic section and recorder. That is, so long as the probe information of the data packets that arrived at the reception node can be all processed, its process may be all performed in series or in parallel.

Embodiment 4

In the embodiment 3, the case of inserting the probe information into each of the grouped data packets to distribute and transmit its data packets to a plurality of the paths group by group was explained. In this embodiment, similarly to the embodiment 2, the case of generating the dummy packet if the number of the data packet in the queue 302 is one or less for a predetermined time or more will be explained.

Figure 8:
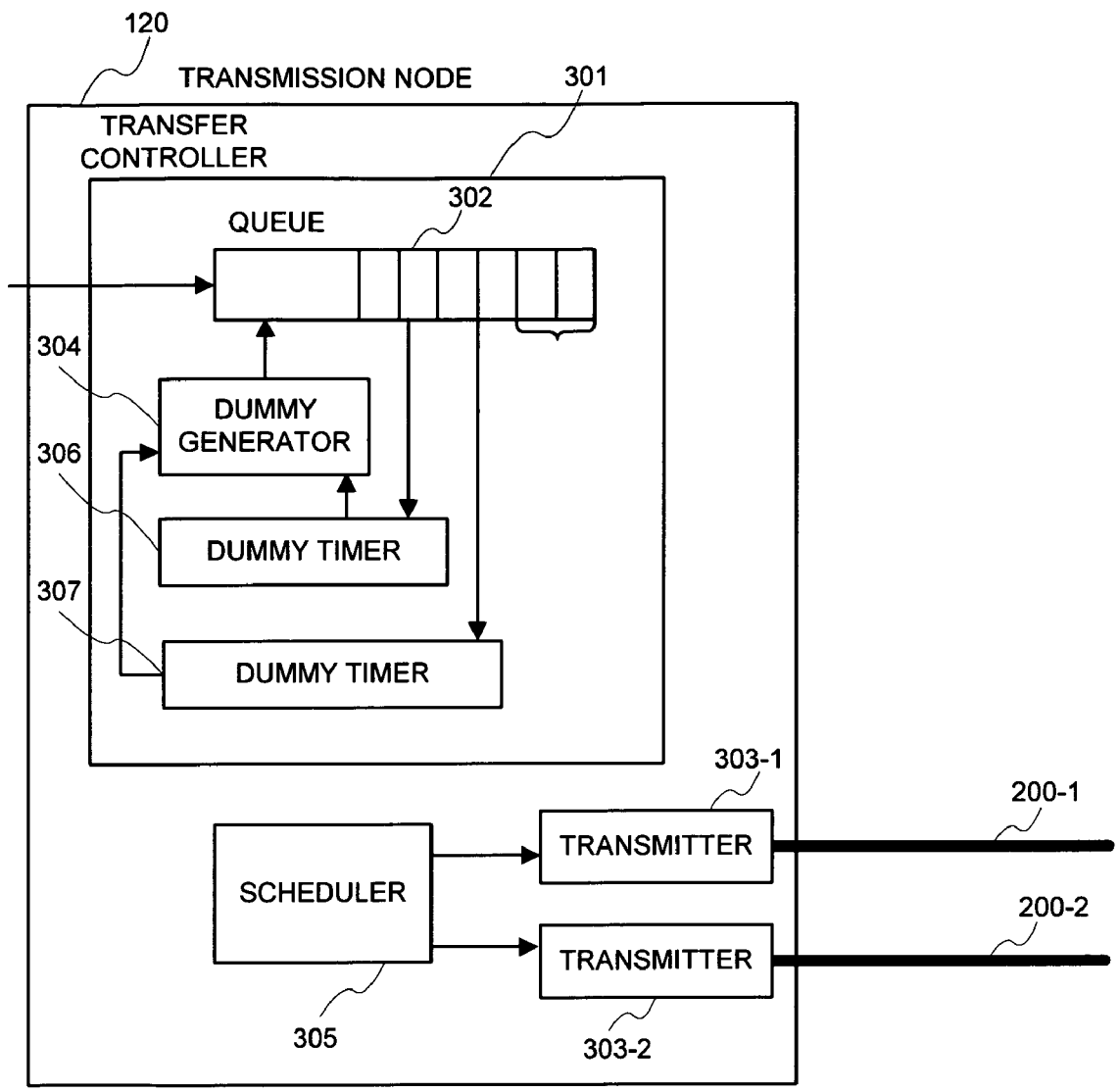
FIG. 8 is a configuration view of an embodiment 4.

FIG. 8 is a configuration view of the transmission node in this embodiment. Additionally, the identical number is affixed to the component similar to that of the foregoing embodiments, and detailed explanation is omitted.

Continuously, an operation of generating one dummy packet of this embodiment will be explained.

Figure 9:
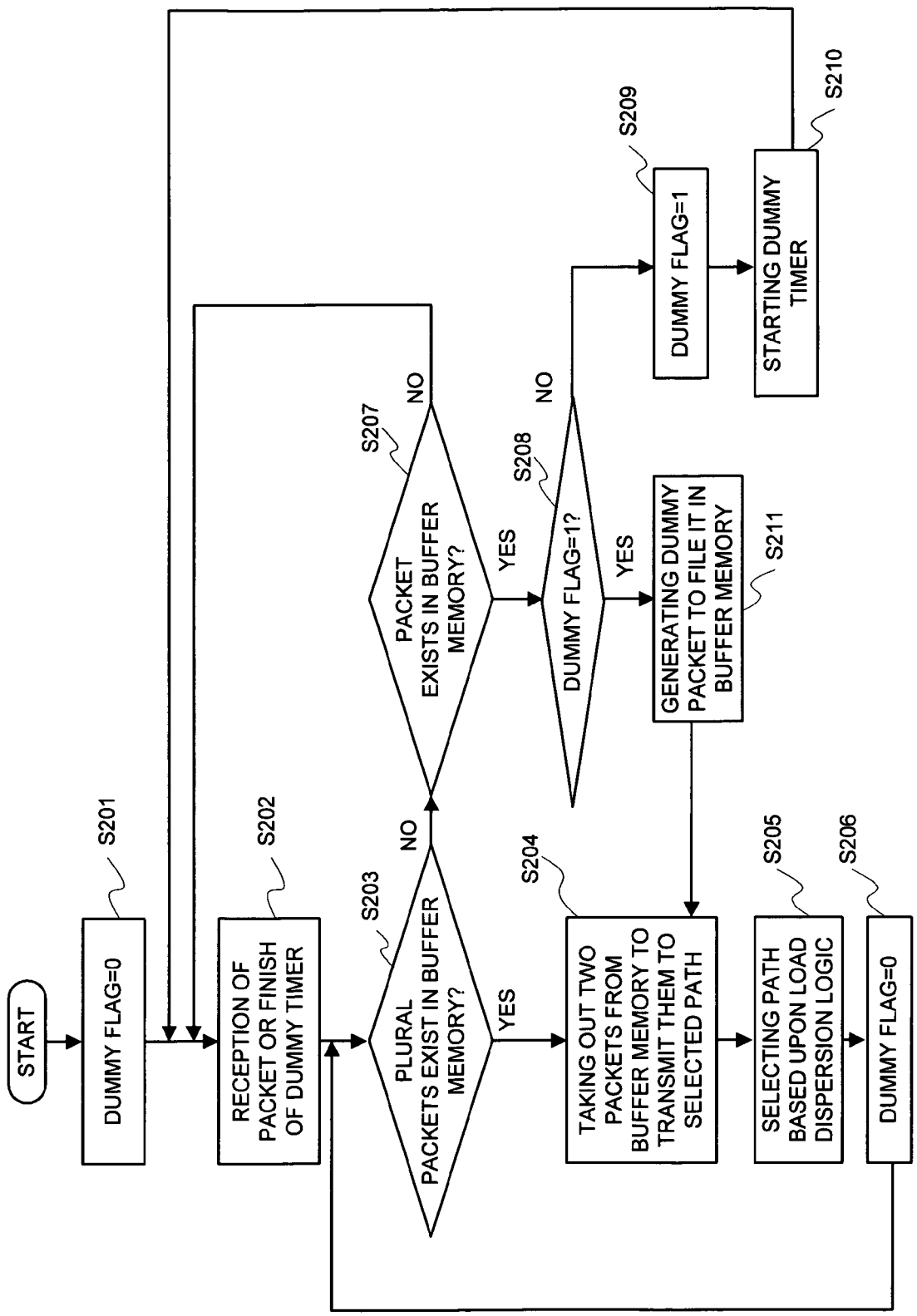
FIG. 9 is a flowchart of the embodiment 4.

FIG. 9 is a flowchart for explaining the operation of generating one dummy packet of this embodiment.

At first, the dummy flag, which is in an initial state, bears 0 (step S201). And, the operation waits for the reception of the data packet or the finish of the dummy timer 306 (step S202). Herein, the dummy timer has not started yet, whereby the operation waits for the reception of the data packet.

When the transfer controller 301 receives the data packet, the received data packet is filed in the queue 302 for the time being. And, the transfer controller 301 monitors the number of the data packet of the queue 302, and determines whether the number of the data packet is plural (step S203).

At this time, if it is assumed that a plurality of the data packets have been received consecutively, the transfer controller 301 determines that the number of the data packet of the queue 302 is plural, and groups the data packets of the queue 302 to transfer them to the scheduler 305 (step S204). And, the scheduler 305 receives the grouped data packets, and distributes them to the transmitter 303 in unit of its grouped data packet (step S205). And, the dummy flag is reset (step S206) and the operation returns to the step S203.

On the other hand, if it is assumed that only one data packet has been received, it is determined that the number of the data packet is not plural, and next, it is determined whether the number of the data packet is one (1) (step S207). Herein, only one data packet has been received, whereby it is determined that it is one (1), and next, it is determined whether the dummy flag bears 1 (step S208). At this moment, it is determined that the dummy flag bears 0 because the dummy flag bears is in an initial state, which means 0 (zero), and one (1) is inserted into the dummy flag (step S209). And, the dummy timer 306 is started (step S210), and the operation returns to the step S202, and waits for the reception of the data packet or the finish of the dummy timer 306.

And, at this time, when the transfer controller 301 receives the data packet, the operation proceeds to the step S203, in which it is determined whether the number of the data packet is plural. Herein, the transfer controller 301 has received the data packet, whereby the operation proceeds to the step S204, in which the transfer controller 301 groups the data packets filed in the queue 302, and transfers them to the scheduler 305. And, the operation proceeds to the step S205, in which the scheduler 305 receives the grouped data packets and distributes them to the transmitter 303 in unit of its grouped data packet, and proceeds to the step S206. The dummy flag is reset, and the operation returns to the step S203.

On the other hand, in a case where the dummy timer 306 started in the step S210 has finished, the operation proceeds to the step S203, in which it is determined whether the number of the data packet is plural. Herein, the data packet has not been received, but the started dummy timer 306 has finished, whereby the operation proceeds to the step 207, in which it is determined whether the number of the data packet is one (1). Herein, it is determined that it is one (1), and the operation proceeds to the step S208, in which it is determined whether the dummy flag bears 1. At this time, the dummy flag bears 1, whereby the dummy generator 304 prepares one dummy packet and files it in the queue 302 (step S211). When the dummy packet is filed in the queue 302, the operation proceeds to the step S204, in which the transfer controller 301 groups the data packets and the dummy packets filed in the queue 302 and transfers them to the scheduler 305. And, the operation proceeds to the step S205, in which the scheduler 305 receives the grouped data packets, and distributes them to the transmitter 303 in unit of its grouped data packet, and the operation proceeds to the step S206. The dummy flag is reset, and returns to the step S203.

Next, in this embodiment, an operation of generating two dummy packets will be explained.

The dummy timer 307 starts when the data packet runs short in the queue 302. And, when a predetermined time elapses and the dummy timer 307 finishes, the dummy generator 304 prepares two dummy packets and files them in the queue 302. When the dummy packets are filed in the queue 302, the transfer controller 301 groups two dummy packets filed in the queue 302 and transfers them to the scheduler 305. And, simultaneously with transmission, the dummy timer 307 is reset.

Additionally, in this embodiment, the dummy timers 306 and 307 are provided in the transfer controller 301; however it is not limited hereto. That is, they may be provided in the dummy generator 304.

The invention claimed is:

1. A speed calculation system for calculating a communication speed of a packet that passes through a communication path connecting a transmission node and a reception node, characterized in that:

said transmission node includes:
  a grouping means for grouping at least two of received packets; and
  a transmission means for affixing probe information for uniquely identifying said grouped packet group to each packet of the packet group, and consecutively transmitting the packets, belonging to an identical packet group; and said reception node includes:
  a receiving means for receiving said transmitted packet;
  a recording means for recording an arrival time of said received packet;
  a determining means for determining whether the probe information is included in said received packet; and
  a calculating means for calculating a communication speed based upon a difference between the arrival times of the packets, belonging to an identical packet group as identified by the probe information, among the packets determined to have said probe information included, characterized in that said calculating means is a calculating means for dividing a total bit number of the packets except the packet that arrived firstly, out of the packets, belonging to an identical packet group as identified by the probe information, by a difference between the arrival times, thereby to calculate the communication speed.

2. The speed calculation system according to claim 1, characterized in that, in a case where said communication path is plural, said transmission means includes further a selecting means for selecting one path from among said plurality of said communication paths.

3. The speed calculation system according to claim 2, characterized in that said selecting means selects the communication path of which a communication load is small from among said plurality of said communication paths.

4. The speed calculation system according to claim 1, characterized in that said transmission node further includes a means for generating one dummy packet in a case where, after receiving one packet, the next packet is not received within a predetermined time.

5. The speed calculation system according to claim 1, characterized in that said transmission node further includes a means for generating at least two dummy packets in a case where the packet is not received within a predetermined time.

6. A node of a calculation system for, from a difference between arrival times of received packets, calculating a speed of the packet, characterized in including:

a receiving means for receiving the packet;

a recording means for recording the arrival time of said received packet;

a determining means for determining whether probe information for indicating that the packets have been grouped is included in said received packet; and a calculating means for calculating a communication speed based upon a difference between the arrival times of the packets, belonging to an identical packet group as identified by the probe information, among the packets determined to have said probe information included, characterized in that said calculating means is a calculating means for dividing a total bit number of the packets except the packet that arrived firstly, out of the packets, belonging to an identical packet group as identified by the probe information, by a difference between the arrival times, thereby to calculate the communication speed.

7. A speed calculation method for calculating a speed of a packet that passes through a communication path connecting a transmission node and a reception node, characterized in including:

a grouping step of grouping at least two of received packets;

a transmission step of affixing probe information for uniquely identifying said grouped packet group to each packet of the packet group, and consecutively transmitting the packets, belonging to an identical packet group;

a receiving step of receiving said transmitted packet and causing a recorder to record an arrival time of this received packet;

a determining step of determining whether the probe information is included in said received packet;

a calculating step of calculating a communication speed based upon a difference between the arrival times of the packets, belonging to an identical packet group as identified by the probe information, among the packets determined to have said probe information included, characterized in that said calculation step is a step of dividing a total bit number of the packets except the packet that arrived firstly, out of the packets, belonging to an identical packet group as identified by the probe information, by a difference between the arrival times, thereby to calculate the communication speed.

8. The speed calculation method according to claim 7, characterized in that, in a case where said communication path is plural, said transmission step further includes a selecting step of selecting one path from among said plurality of said communication paths.

9. The speed calculation method according to claim 8, characterized in that said selecting step is a step of making a selection so that communication loads in said plurality of said communication paths can be dispersed.

10. The speed calculation method according to claim 7, characterized in further including a step of generating one dummy packet in a case where, after receiving one packet, the next packet is not received within a predetermined time.

11. The speed calculation method according to claim 7, characterized in further including a step of generating two dummy packets in a case where the packet is not received within a predetermined time.

12. A program of a speed calculation system for calculating a speed of a packet that passes through a communication path connecting a transmission node and a reception node, characterized in causing:

said transmission node to function as:
a grouping means for grouping at least two of received packets; and
a transmission means for affixing probe information for uniquely identifying said grouped packet group to each packet of the packet group, and consecutively transmitting the packets, belonging to an identical packet group; and said reception node to function as:
a receiving means for receiving said transmitted packet;
a recording means for causing a recorder to record an arrival time of said received packet;
a determining means for determining whether the probe information is included in said received packet; and
a calculating means for calculating a communication speed based upon a difference between the arrival times of the packets, belonging to an identical packet group as identified by the probe information, among the packets determined to have said probe information included, characterized in causing said calculating means to function as a calculating means for dividing a total bit number of the packets except the packet that arrived firstly, out of the packets, belonging to an identical packet group as identified by the probe information, by a difference between the arrival times, thereby to calculate the communication speed.

13. The program according to claim 12, characterized in, in a case where said communication path is plural, further causing said transmission means to function as a selecting means for selecting one path from among said plurality of said communication paths.

14. The program according to claim 13, characterized in causing said selecting means to function so as to make a selection so that communication loads in said plurality of said communication paths can be dispersed.

15. The program according to claim 12, characterized in further causing said grouping means to function as a means for generating one dummy packet in a case where, after receiving one packet, the next packet is not received within a predetermined time.

16. The program according to claim 12, characterized in further causing said grouping means to function as a means for generating two dummy packets in a case where the packet is not received within a predetermined time.

17. A program of a node in a calculation system for, from a difference between arrival times of received packets, calculating a speed of the packet, characterized in causing said node to function as:

a recording means for recording the arrival time of the received packet;

a determining means for determining whether probe information for indicating that the packets have been grouped is included in said received packet; and a calculating means for calculating a communication speed based upon a difference between the arrival times of the packets, belonging to an identical packet group as identified by the probe information, among the packets determined to have said probe information included, characterized in that said calculating means is a calculating means for dividing a total bit number of the packets except the packet that arrived firstly, out of the packets, belonging to an identical packet group as identified by the probe information, by a difference between the arrival times, thereby to calculate the communication speed.

* * * * *